United States Patent
Ma et al.

(10) Patent No.: US 8,274,477 B2
(45) Date of Patent: Sep. 25, 2012

(54) COMPUTER MOUSE

(75) Inventors: Xian-Wei Ma, Shenzhen (CN); Yu-Hao Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 395 days.

(21) Appl. No.: 12/646,861

(22) Filed: Dec. 23, 2009

(65) Prior Publication Data

US 2010/0309128 A1    Dec. 9, 2010

(30) Foreign Application Priority Data

Jun. 9, 2009    (CN) .......................... 2009 1 0303089

(51) Int. Cl.
G09G 5/08    (2006.01)
(52) U.S. Cl. ...................................................... 345/166
(58) Field of Classification Search .................. 345/166, 345/163, 156, 157; 348/211, 275
See application file for complete search history.

(56) References Cited

U.S. PATENT DOCUMENTS

| | | | |
|---|---|---|---|
| 6,710,768 B2 * | 3/2004 | Muranami | 345/166 |
| 7,034,804 B2 * | 4/2006 | Lai et al. | 345/163 |
| 7,460,107 B1 * | 12/2008 | Bohn | 345/166 |
| 7,593,593 B2 * | 9/2009 | Wilson | 382/275 |
| 7,613,358 B2 * | 11/2009 | Wilson | 382/275 |
| 7,654,459 B2 * | 2/2010 | Orsley et al. | 235/427 |
| 7,944,170 B2 * | 5/2011 | Watanabe | 320/108 |
| 8,165,422 B2 * | 4/2012 | Wilson | 382/275 |
| 2002/0085097 A1 * | 7/2002 | Colmenarez et al. | 348/211 |
| 2003/0233138 A1 * | 12/2003 | Spooner | 607/93 |
| 2004/0017354 A1 * | 1/2004 | Muranami | 345/156 |
| 2007/0098407 A1 * | 5/2007 | Hebrank et al. | 398/106 |
| 2009/0179856 A1 * | 7/2009 | Scott | 345/157 |
| 2009/0267895 A1 * | 10/2009 | Bunch | 345/157 |
| 2011/0128258 A1 * | 6/2011 | Liang | 345/180 |

* cited by examiner

*Primary Examiner* — Fred Tzeng
(74) *Attorney, Agent, or Firm* — Altis Law Group, Inc.

(57) ABSTRACT

A wireless computer mouse includes a first operating portion, a second operating portion, a circuit board, and a switch. A pair of LEDs is mounted on the circuit board. One of the LEDs corresponds to the first operating portion, and another LED corresponds to the second operating portion. An optic member is mounted on the circuit board. The optic member includes two opposite reflecting portions. Each of the reflecting portions corresponds to one LED, and each of the reflecting portions is configured to reflect the light of the corresponding LED to highlight a surface underneath the mouse. The switch is configured for selectively enabling the first operating portion and the second operating portion. When the first operating portion is enabled, the LED corresponding to the first operating portion lights. When the second operating portion is enabled, the LED corresponding to the second operating portion lights.

7 Claims, 2 Drawing Sheets

COMPUTER MOUSE

BACKGROUND

1. Technical Field

The present disclosure relates to computer peripherals and, particularly, to a computer mouse.

2. Description of Related Art

Generally, computer mice are designed for right handed use. However, when the right arm is tired, injured or not free and the user needs to use his/her left hand to control the computer mouse, the user has to reconfigure the computer operating system to change the settings for the mouse functions for left handed use. It is troublesome and inconvenient to reconfigure the operating System.

SUMMARY

The primary object of the present disclosure is to provide a computer mouse allowing users to use with it with either hand, without the complication of reconfiguring the computer operating system. The computer mouse of the present disclosure has a symmetrical structure including two directional-oppositely disposed operation portions. The two operating portions include a first operating portion and a second operating portion. The computer mouse further comprises a circuit board, and a first LED, a second LED, an optical member and a switch mounted on the circuit board. The optical member comprises two opposite reflecting portions respectively correspond to the first and the second LEDs. The switch is configured for selectively enabling the first operating portion and the second operating portion, wherein when the first operating portion is enabled, the first LED lights and the second LED does not light, and when the second operating portion is enabled, the second LED lights and the first LED does not light. Therefore, users are able to activate the desired one from the first operating portion and the second operating portion via controlling the switch, and use the computer mouse of the present disclosure with either hand.

BRIEF DESCRIPTION OF THE DRAWINGS

The components of the drawings are not necessarily drawn to scale, the emphasis instead being placed upon clearly illustrating the principles of a computer mouse. Moreover, in the drawings, like reference numerals designate corresponding parts throughout several views.

DETAILED DESCRIPTION

Figure 1:
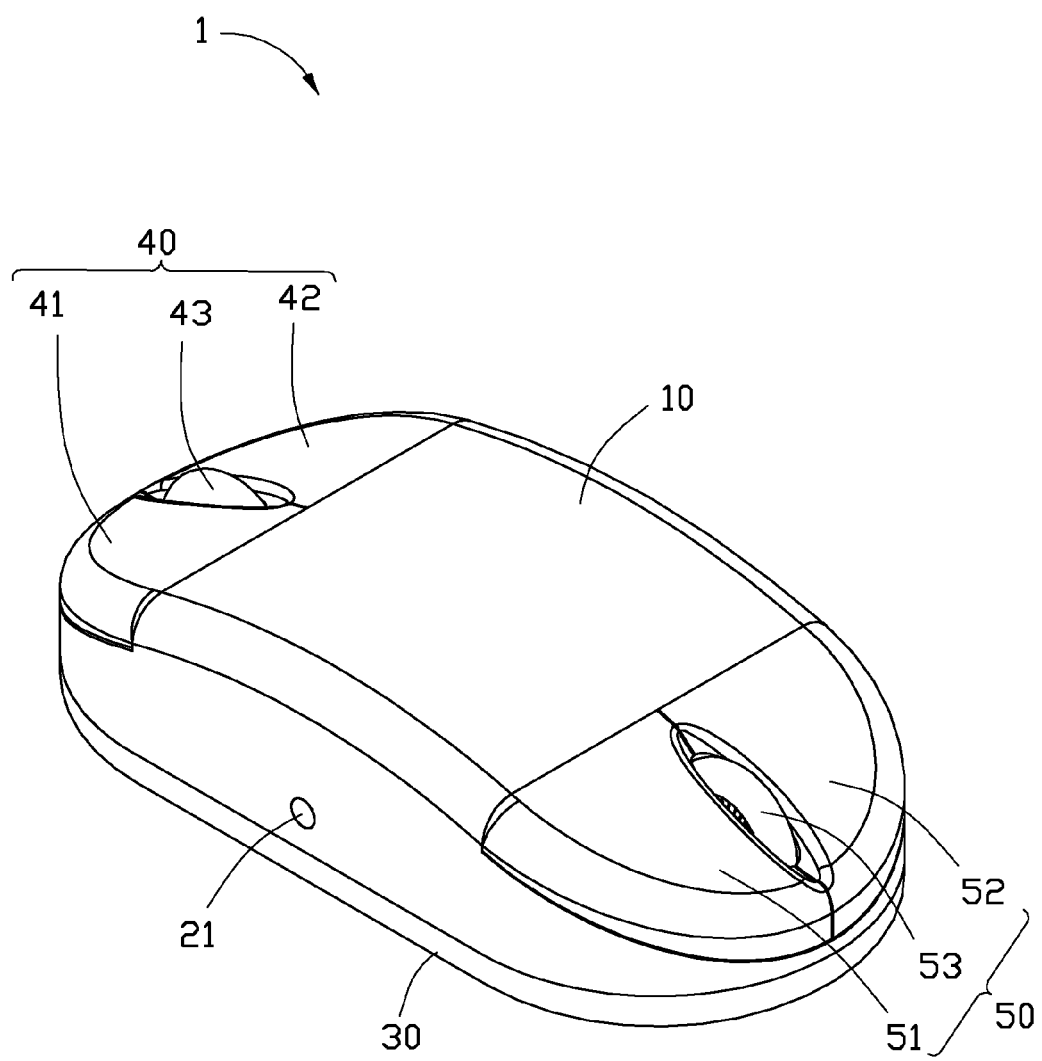
FIG. 1 is an isometric view of a computer mouse in accordance with an exemplary embodiment.
Figure 2:
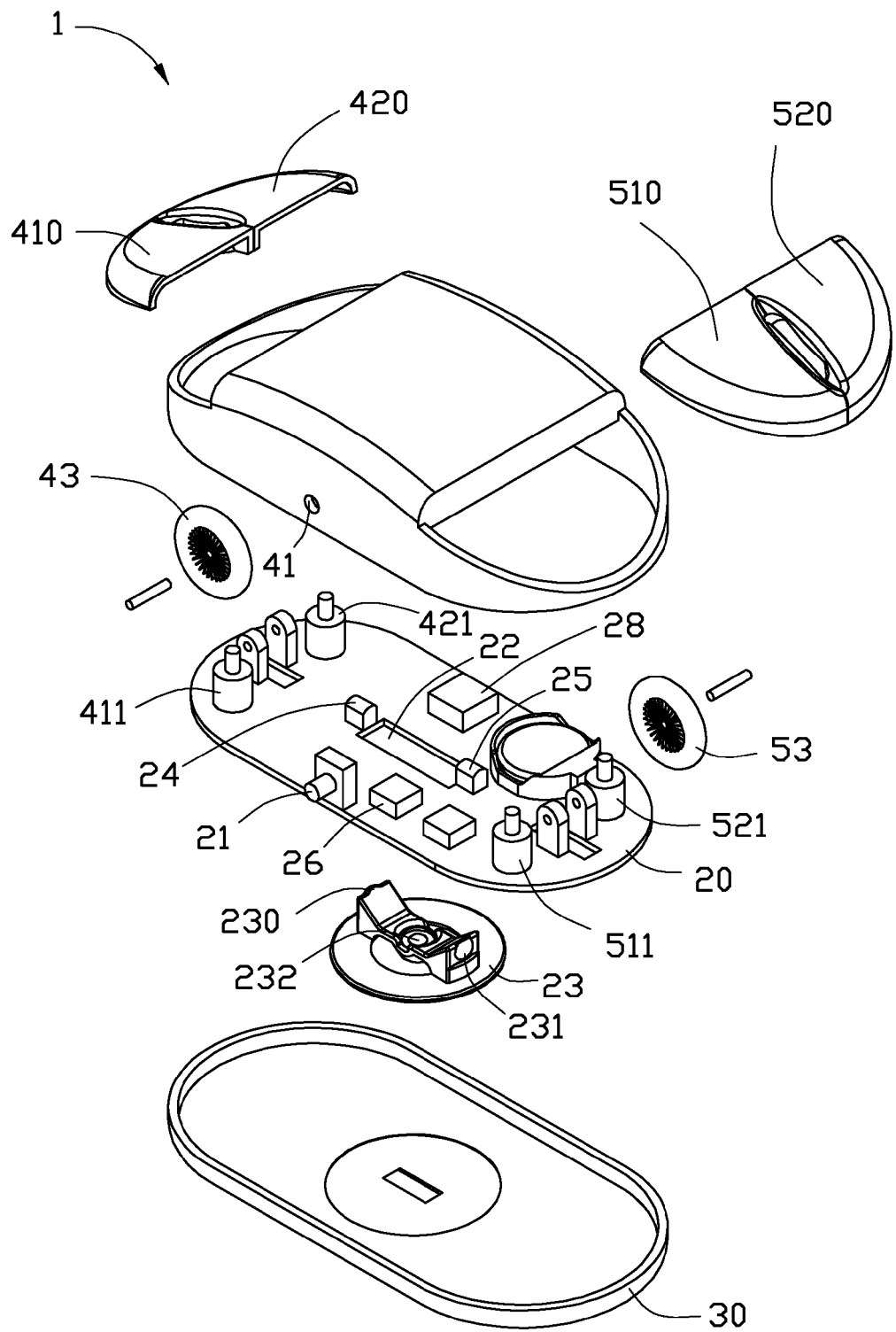
FIG. 2 is an exploded, perspective view of the computer mouse of FIG. 1.

Referring to FIGS. 1-2, an embodiment of a wireless computer mouse 1 is illustrated. The computer mouse 1 includes a first cover 10 and a second cover 30. The first cover 10 cooperates with the second cover 30 to form an interior space for receiving a circuit board 20.

One end of the computer mouse 1 includes a first operating portion 40, and the opposite end includes a second operating portion 50. In the embodiment, the first operating portion 40 includes a first left button 41, a first right button 42, and a first wheel 43. The second operating portion 50 includes a second left button 51, a second right button 52, and a second wheel 53. The function of the first left button 41 is the same as that of the second left button 51, and the function of the first right button 42 is the same as that of the second right button 52. In the embodiment, the first operating portion 40 is configured for right handed use, and the second operating portion 50 is configured for left handed use.

The mouse 1 further includes a switch 21 for selectively enabling the first operating portion 40 or the second operating portion 50.

One end of the first cover 10 includes a first left pressing surface 410 of the first left button 41 and a first right pressing surface 420 of the first right button 42. The opposite end of the first cover 10 includes a second left pressing surface 510 of the second left button 51 and a second right pressing surface 520 of the second right button 52. One sidewall of the first cover 10 defines a through hole 41 for receiving the switch 21.

A first left pressing post 411 and a first right pressing post 421 protrude from one end of the circuit board 20, respectively. The first left pressing surface 410 and the first left pressing post 411 cooperatively form the first left button 41, and the first right pressing surface 420 and the second pressing post 421 cooperatively form the first right button 42. A second left pressing post 511 and a second right pressing post 521 protrude from the opposite end of the circuit board 20, respectively. The second left pressing surface 510 and the second left pressing post 511 cooperatively form the second left button 51, and the second right pressing surface 520 and the second right pressing post 521 cooperatively form the second right button 52.

The switch 21 is mounted on the top surface of the circuit board 20. A portion of the switch 21 extends through the through hole 41 and is exposed to the first cover 10. The exposed portion of the switch 21 is used for the users to operate the switch 21.

The middle of the circuit board 20 defines a receiving space 22 for receiving a portion of an optical member 23. A pair of light emitting diodes (LEDs) 24 and 25 is disposed on opposite ends of the receiving space 22, respectively. The LED 24 is referred to as a second LED corresponding to the second operating portion 50, and the LED 25 is referred to as a first LED corresponding to the first operating portion 40. The optical member 23 includes a pair of reflecting portions 230 and 231, and a lens 232. The reflecting portion 230 is configured for reflecting the light of the LED 24, helping to highlight a surface underneath the mouse 1, and the reflecting portion 231 is configured for reflecting the light of the LED 25, also helping to highlight the surface underneath the mouse 1. The lens 232 is disposed between the reflecting portions 230 and 231. The function of the lens 232 is the same as that of a lens of a conventional computer mouse. That is, the lens 232 continually captures images of the surface underneath the mouse 1 and transmits the captured images to an optical sensor 26 mounted on the circuit board 20. The optical sensor 26 is configured for processing the images and determining the speed and the direction of a movement of the mouse 1. A wireless communication element 28 is mounted on the circuit board 28. The computer mouse 1 wirelessly communicates with a computer (not shown) via the communication element 28.

In the embodiment, when the switch 21 is pressed a first time, the first operating portion 40 is enabled, the LED 25 lights and LED 24 does not light, and the light of the LED 25 is reflected to highlight the surface underneath the mouse 1. That is, the mouse 1 works as a conventional mouse for right handed use. When the switch 21 is pressed again, the second operating portion 50 is enabled, the LED 24 lights and LED 25 does not light, and the light of the LED 24 is reflected to highlight the surface underneath the mouse 1. That is, the mouse 1 is switched for left handed use. It should be noted that, when the mouse 1 is switched from right handed use to left handed use, the mouse 1 needs to be turned 180 degree. Under this condition, the reflected light of the LED 24 can be used to rightly determine the movement of the mouse 1, and the mouse 1 can work as a conventional mouse switched for left handed use. In an alternative embodiment, when the switch 21 is pressed a first time, the second operating portion 50 is enabled, and the mouse 1 is for left handed use. When the switch 21 is pressed again, the first operating portion 40 is enabled, and the mouse 1 is for right handed use.

With such configuration, a user can conveniently use the mouse 10 with either hand without the complication of reconfiguring the computer operating system.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A mouse comprising:
   a first operating portion on one end of the mouse;
   a second operating portion on an opposite end of the wireless mouse;
   a circuit board, wherein a first light emitting diode (LED) and a second LED are mounted on the circuit board, the first LED corresponds to the first operating portion, and the second LED corresponds to the second operating portion; and an optical member is mounted on the circuit board, the optical member comprises two opposite reflecting portions and a lens, the reflecting portions respectively correspond to the first LED and the second LED, and each of the reflecting portions is configured to reflect the light of the corresponding LED to highlight a surface underneath the mouse, and the lens continuously captures images of the surface underneath the mouse and transmits the captured images to an optical sensor to determine the speed and the direction of a movement of the mouse; and
   a switch mounted on the circuit board configured for selectively enabling the first operating portion and the second operating portion, wherein when the first operating portion is enabled, the first LED lights and the second LED does not light, and when the second operating portion is enabled, the second LED lights and the first LED does not light.

2. The mouse as described in claim 1, wherein the first operating portion comprises a first left button, a first right button, and a first wheel.

3. The mouse as described in claim 2, wherein the second operating portion comprises a second left button, a second right button, and a second wheel.

4. The mouse as described in claim 1, further comprising a first cover defining a through hole, wherein a portion of the switch extends through the through hole and is exposed from the first cover, and the exposed portion of the switch is configured for users to operate the switch.

5. The mouse as described in claim 1, wherein when the switch is pressed a first time, the first operating portion is enabled, and when the switch is pressed again, the second operating portion is enabled.

6. The mouse as described in claim 1, wherein when the switch is pressed a first time, the first operating portion is enabled, and when the switch is pressed again, the second operating portion is enabled.

7. The mouse as described in claim 1, further comprising a wireless communication element connected with the circuit board and to communicate with a computer.

* * * * *